J. NEATH.
Check for Oil-Wells.
No. 218,052.  Patented July 29, 1879.
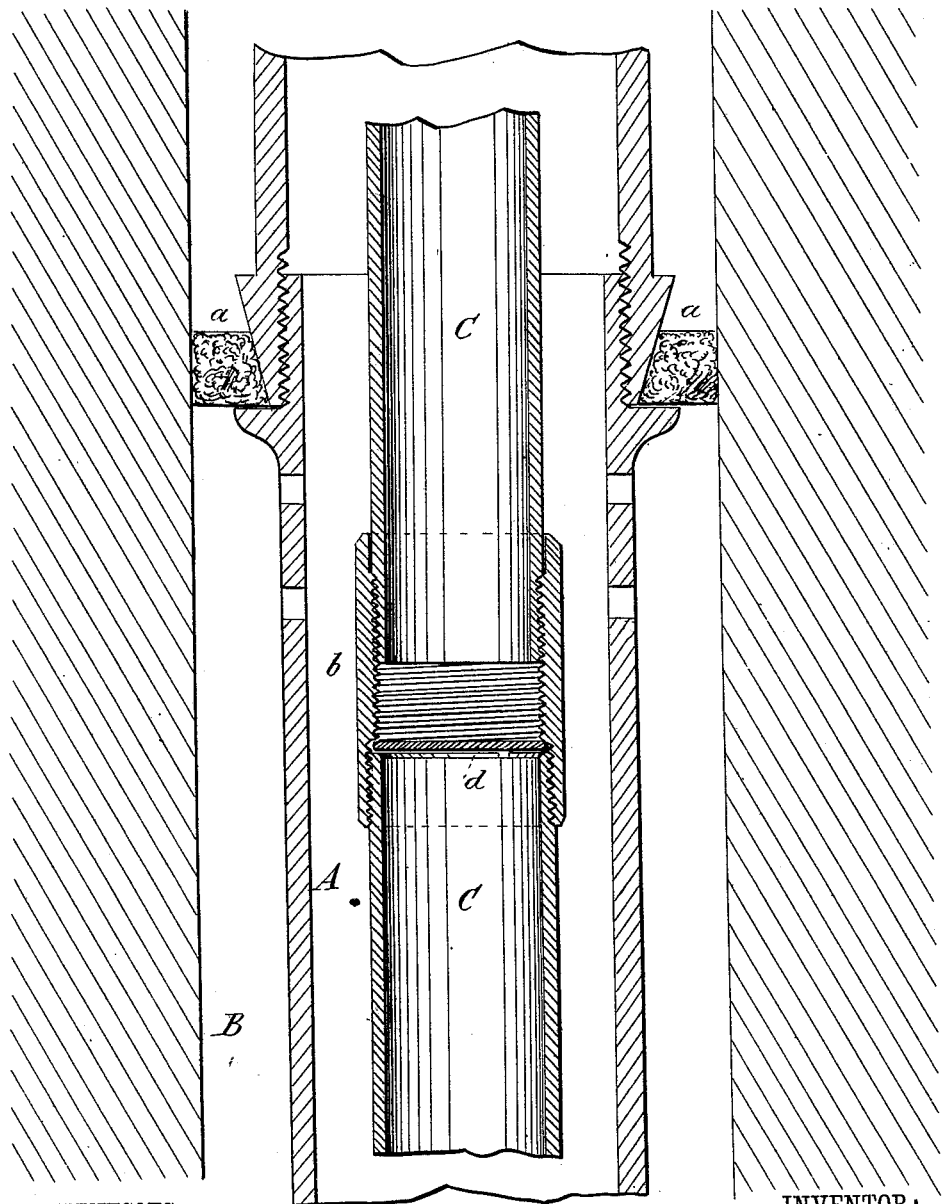

UNITED STATES PATENT OFFICE.

JASPER NEATH, OF SHAMBURG, PENNSYLVANIA.

IMPROVEMENT IN CHECKS FOR OIL-WELLS.

Specification forming part of Letters Patent No. 218,052, dated July 29, 1879; application filed June 17, 1879.

*To all whom it may concern:*

Be it known that I, JASPER NEATH, of Shamburg, in the county of Venango and State of Pennsylvania, have invented a new and Improved Check for Oil-Wells, of which the following is a specification.

My invention relates to means for checking or governing the flow of oil from wells during the operation of tubing, with the object to save the oil usually wasted by the overflow and prevent the danger of conflagration.

For a proper understanding of the invention I will briefly describe the usual operations.

The usual casing of the well is fitted with a head, connected by a pipe with the tank, and during the tubing operation the head is fitted with a rubber gasket, having an aperture for the tubing to be passed through, so that the oil cannot escape around the tube. It is, however, necessary, before tubing, to explode the torpedo in the well, which sets the oil flowing through the casing and into the tanks, and as soon as the oil ceases to flow the tubing operation is commenced, the tubes being screwed together and lowered length by length until bottom is reached. The lower joint consists of short telescopic section, fitted with a tapering mandrel and rubber collar, so that the weight of the tube causes the expansion of the collar and packs the casing around the tube, whereby the well thereafter discharges through the tubing. During this tubing operation, which occupies from five to ten hours, the oil accumulates in the well, and while there is opportunity for it to pass out by the casing to the tanks, it takes the smaller exit by the tubing, and discharges at intervals with great force, drenching the workman, and wasting from fifty to one hundred barrels of oil. Besides this, there is great liability of the fine spray becoming ignited from the boiler-furnaces and causing a general conflagration.

My invention consists in a check or packing device applied in connection with the usual packing devices, or at one of the lower joints in the tubing, to prevent any flow of oil through the tubing.

The invention will be described in connection with the accompanying drawing, which represents an oil-well, in section, with the casing and tubing applied thereto.

A is the casing within the well B, packed around the outside, at *a*, with seed-bags or other devices, as usual; and C C are lengths of tubing, connected together by the thimble or coupling *b*. *d* is the check or packing applied at the joint of the section C.

The check *d* consists of a circular disk of metal, of a size adapted for covering the end of tube C, and held in place by a shoulder on the coupling *b*, so as to form a tight packing and entirely close the pipe C.

The disk D is preferably made of Babbitt metal, but may be of any suitable material or composition that is of a brittle character and sufficiently strong to withstand the pressure.

The check will be applied to one of the lower joints, which in the process of tubing are the first made, or to a joint especially adapted for the purpose, or in connection with the usual packing devices that are applied to the lower length of tubing.

This check prevents any flow of oil through the tubing, so that when sufficient pressure has accumulated to cause a flow the oil will pass outside the tubing by the casing A to the tanks. The tubing operation may, therefore, be conducted with safety and expedition and without waste of oil.

When the tubing operation is completed and the tubes connected, the check-disk *d* is to be broken by dropping into the tubing a small piece of tube or other weight sufficiently heavy to break the disk and give free exit to the oil.

Having thus described my invention, I claim as new and desire to secure by Letters Patent—

In combination with the tubes of an oil-well, the check or packing *d*, consisting of a disk of metal or other material applied during the tubing operation, substantially as shown and described, and for the purposes set forth.

JASPER NEATH.

Witnesses:
GEO. L. BENTON,
J. E. ACKERLY.